No. 851,995. PATENTED APR. 30, 1907.
W. M. NORRIS.
PROCESS OF COLORING LEATHER.
APPLICATION FILED JULY 9, 1906.
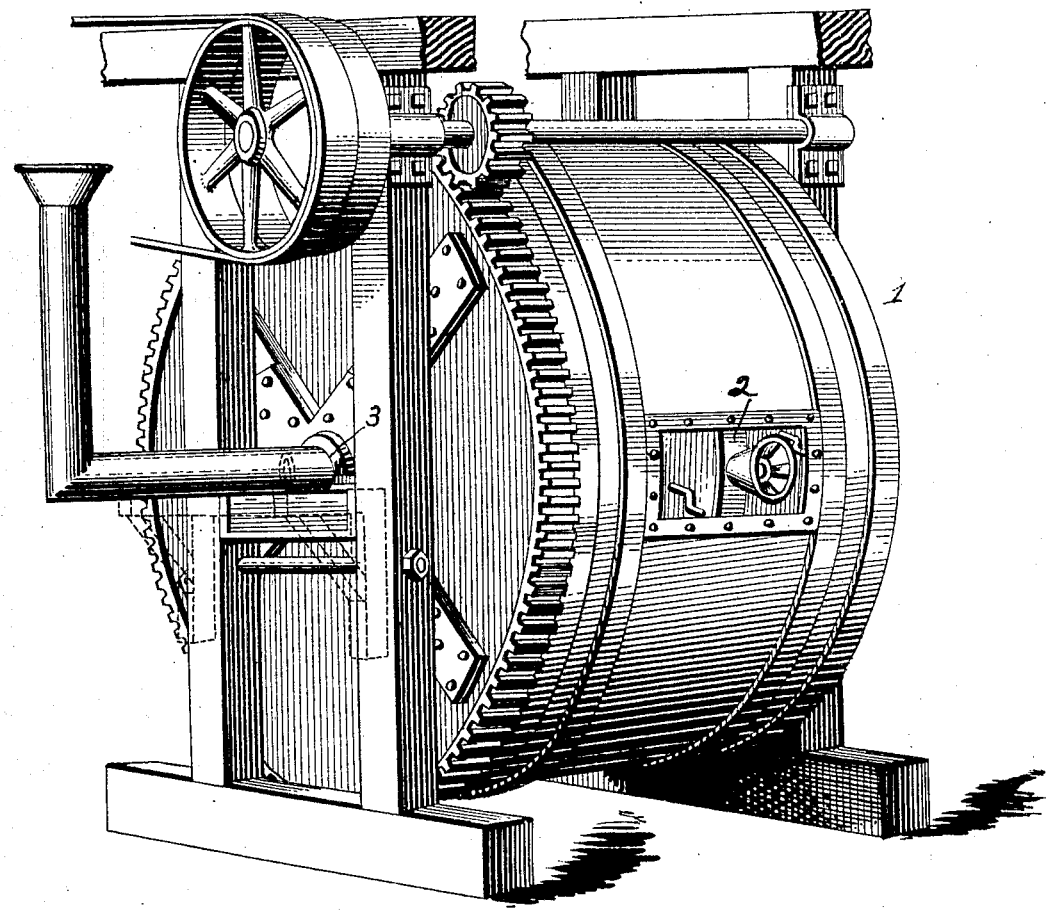
Witnesses
P. F. Nagle.
L. Conville.
Inventor
William M. Norris.
By Wetherbee & Fairbanks.
Attorneys
THE NORRIS PETERS CO., WASHINGTON, D. C.

UNITED STATES PATENT OFFICE.

WILLIAM M. NORRIS, OF PRINCETON, NEW JERSEY.

PROCESS OF COLORING LEATHER.

No. 851,995.  Specification of Letters Patent.  Patented April 30, 1907.

Application filed July 9, 1906. Serial No. 325,245.

*To all whom it may concern:*

Be it known that I, WILLIAM M. NORRIS, a citizen of the United States, residing at Princeton, in the county of Mercer, State of New Jersey, have invented a new and useful Method of Coloring Leather, of which the following is a specification.

My invention consists of certain improvements in a method of coloring or dyeing leather, whereby I can with economy obtain deep, rich and more permanent shades of black, and attain other advantages which are duly set forth hereinafter.

Although my process or method is applicable to coloring or dyeing hides and skins of all descriptions, I will describe the method as applicable to chrome-tanned goat skins. Other leathers may be colored or dyed in the same manner with such changes in the quantity of materials employed and manipulations as their different sizes and characters would require.

In the drawing, I have shown a perspective view of one form of apparatus for carrying out the method or process, but make no claim thereto nor is the present invention restricted to the employment of such form of apparatus.

I employ a drum 1, a form of which, suitable for my purpose, is shown in the accompanying drawings, and place therein say four hundred and fifty pounds of skins as they come from the shaving machines, and thirty gallons of warm water. The covering head 2 of the drum is then closed. Now dissolve two and one-half pounds of permanganate of potash in forty-five gallons of warm water and then add two and one-half pounds of muriatic acid 21° Baumé, this solution being inserted in the drum through the opening 3 in the gudgeon thereof. After ten minutes, stop rotation of the drum, then open the same and allow the liquor which is now spent to run off. Again replace the head of the drum, allow the latter to rotate and add as before through the gudgeon, two gallons of "iron liquor" which has been previously mixed with forty-five gallons of warm water. After ten minutes, stop the rotation of the drum, open the same and allow the liquor, which is now spent, to run off. Next dissolve in forty-five gallons of warm water, three pounds of extract of logwood, or other suitable vegetable extract, and three pounds of sal soda (carbonate of soda), and after the drum has been closed and allowed to rotate as before, add the same through the gudgeon. After ten minutes, stop the drum, open the head and remove the skins. The coloring process is now complete and the stock is washed thoroughly in a "twister" with warm water for fifteen or twenty minutes before being "stained," "fat liquored" and finished in any suitable manner, either for glazed or dull stock.

The "iron liquor" referred to above may be prepared by dissolving scrap iron in dilute commercial acetic acid and the solution prepared ready for use should stand 10° on a Baumé hydrometer. But any suitable ferrous salt of iron may be used.

The other materials mentioned, permanganate of potash, muriatic acid, sal soda and logwood extract are well known articles of commerce.

The temperature of the "warm water" referred to above should be in all cases about 110° Fah. in summer and from 120° to 125° Fah. in winter.

Hydrochloric acid must never be added to a hot concentrated solution of permanganate of potash, as this would result in the evolution of chlorin and the formation of manganous chlorid which is not the salt of manganese desired.

The muriatic acid is added to the permanganate solution when all the required amount of water is present.

As an acidulated solution of permanganate of potash strikes very quickly on leather, there must be a sufficient amount of water present in the drum in order to secure an even distribution over the stock.

Skins which have not been washed clean from the hypo-bath should have the requisite amount of acid added to the first thirty gallons of water referred to. The permanganate dissolved in water is added after an interval of about five minutes.

To determine whether a sufficient amount of permanganate has been used, throw a skin over a "horse" exposed to the sunlight and observe after an interval of fifteen or twenty minutes, whether or not the brown color is uniform and even. If light streaks or spots develop, it indicates that the sulfurous acid in the stock is not entirely neutralized or killed. Such stock should have more permanganate, but it must always be borne in mind that permanganate of potash is a powerful oxidizing agent and can only be safely employed in very dilute solutions.

On bark and vegetable tanned leather, weaker solutions of permanganate than those prescribed above should be employed. When chrome-tanned skins are treated to an acidulated solution of permaganate of potash, all of the latter quickly combines with the stock, imparting to it a brown color. It is reduced by the stock itself to some extent and it thoroughly destroys any sulfurous acid present which has been carried over from the "hypo" bath. Now following this with a ferrous salt of iron, all the remaining permanganate compound is reduced to an insoluble modification and the ferrous iron is oxidized to a ferric state and is at once absorbed by the stock. The final treatment with logwood and soda forms a perfectly insoluble and permanent jet-black which will last as long as the leather itself.

The function of the soda is not merely to assist in the formation of the color-lake by neutralizing the acid liberated from the "iron liquor" but it is necessary to have sufficient alkali present to neutralize all of the acid in the stock which has been taken up from previous steps of the process as well as any acid carried over from the hypo-bath. Stock should be neutral, or only very slightly acid, (never alkaline). After this treatment, it can then be washed perfectly clean in a short time.

The stock being placed in a drum and not removed until all the coloring operations are completed, saves much handling and labor.

Only very small quantities of the various chemicals used are required for a large number of skins, not only making the process a very economical one effecting a considerable saving over present methods, but thus securing the softest possible method of applying coloring materials as the grain is never in the least roughened or contracted.

The stock being thoroughly washed and cleaned before "staining" and "fat liquoring" and all sulfurous acid being eliminated, there is no chance for skins colored by this method, showing any "bloom" or "spew" when finished.

The remarkable fine smooth silky feel which permanganate imparts to skins is retained and emphasized by the subsequent treatments.

Skins colored by this process will "glaze" much brighter and have a far superior finish, more permanent and lasting than when colored by any other method.

In working this process, I have found that the best results were obtained by using the quantities of the materials and the manipulations specified, but I do not confine myself either to these proportions or to these methods of manipulation, as considerable modifications can be made without departing from the essential features of my process.

Having thus described my invention, what I claim as new and desire to secure by Letters Patent, is:

1. A step in the process of dyeing leather which consists in subjecting it to an acidulated solution of permanganate of potash.

2. A step in the process of dyeing leather which consists in subjecting it to an acidulated solution of permanganate of potash and then to a solution of ferrous salt of iron.

3. Those steps in the process of dyeing leather which consists in subjecting it to an acidulated solution of permanganate of potash and then to a solution of a ferrous salt of iron and then to a solution of a suitable vegetable extract.

4. Those steps in the process of dyeing leather which consists in subjecting it to an acidulated solution of permanganate of potash and then to a solution of a ferrous salt of iron and then to a solution of vegetable extract and sal soda and then to a thorough washing with warm water.

WILLIAM M. NORRIS.

Witnesses:
    JOHN A. WIEDERSHEIM,
    S. R. CARR.